W. E. AMBERG.
WELDING TORCH.
APPLICATION FILED JUNE 6, 1918.
1,373,043.
Patented Mar. 29, 1921.
4 SHEETS—SHEET 2.
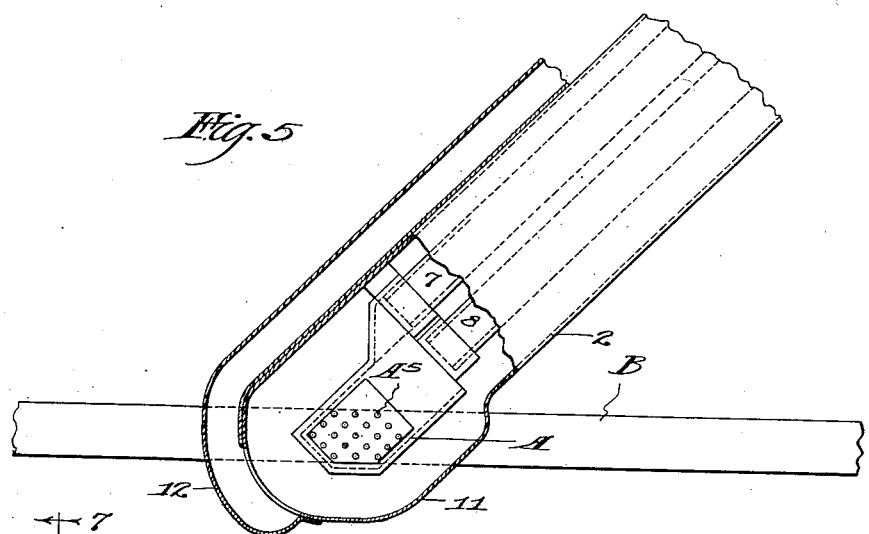
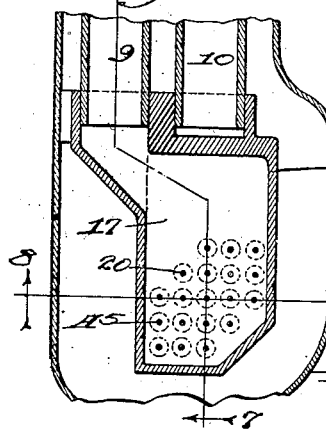
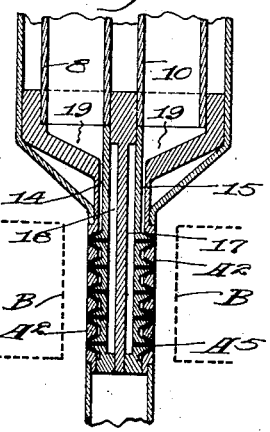
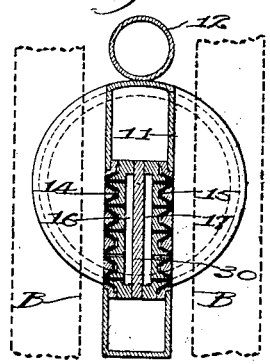
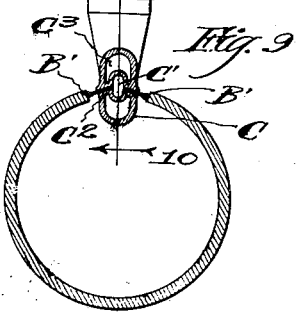
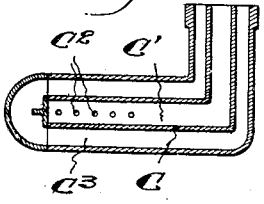
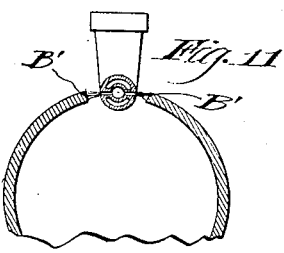
Inventor:
Walter E. Amberg

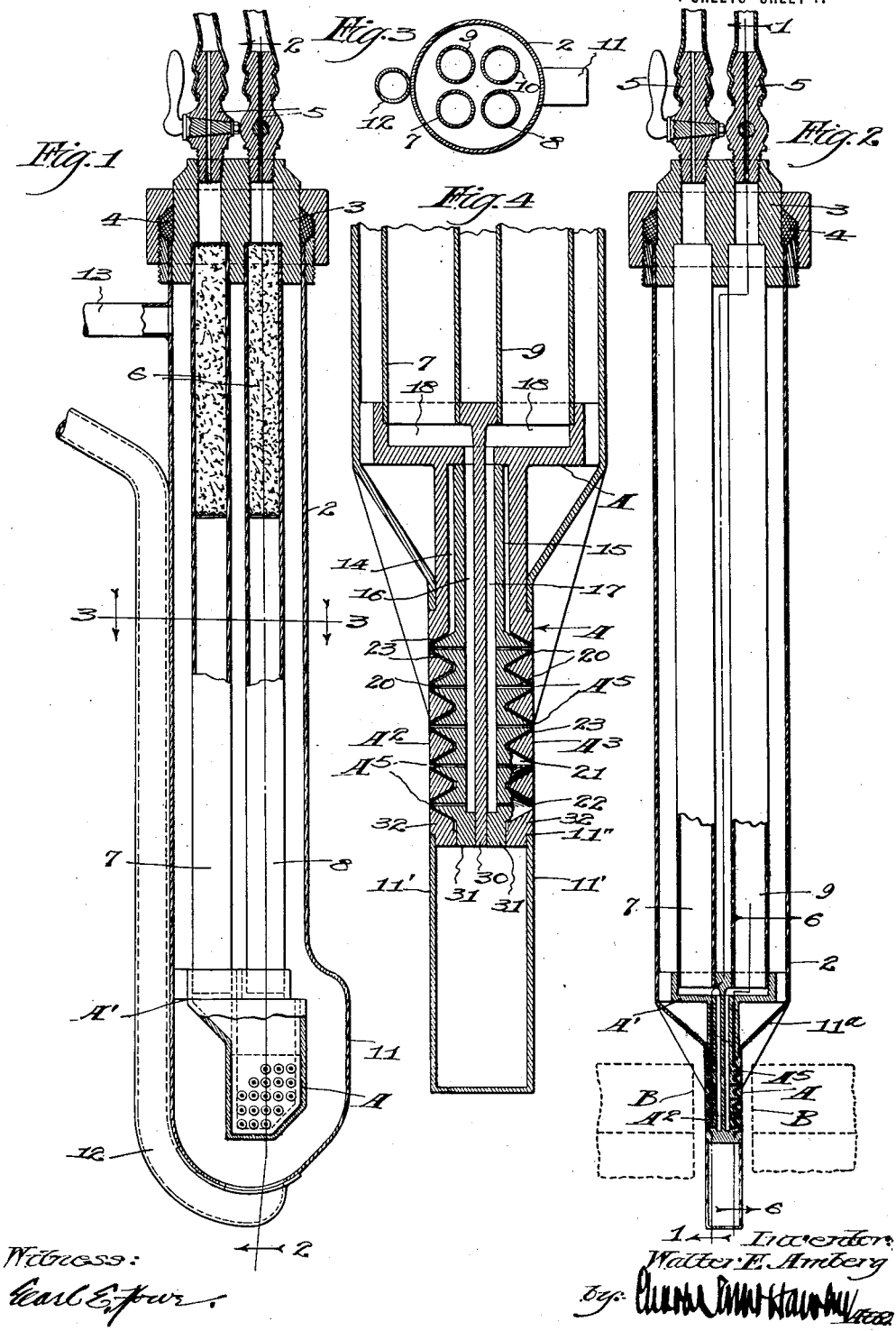

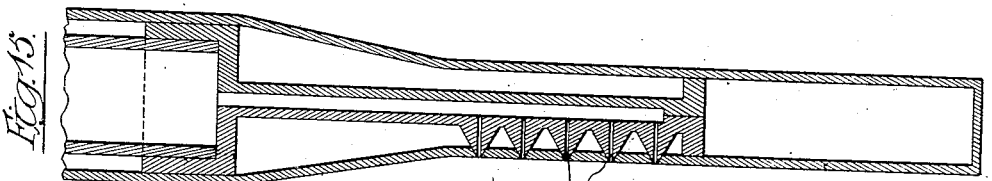
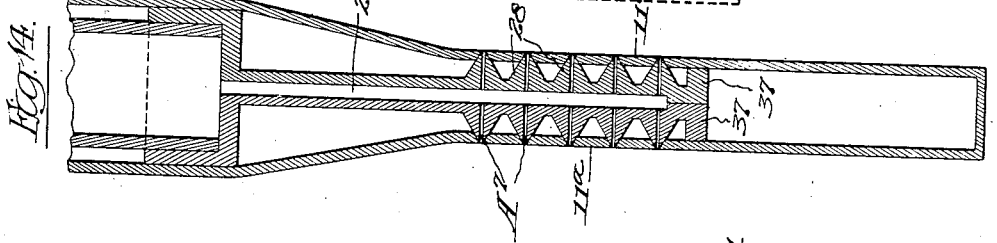
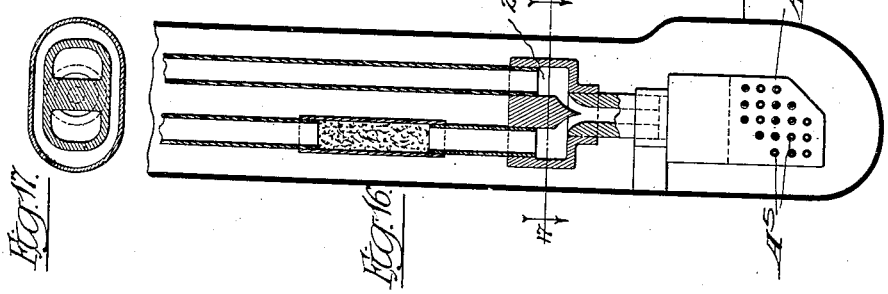
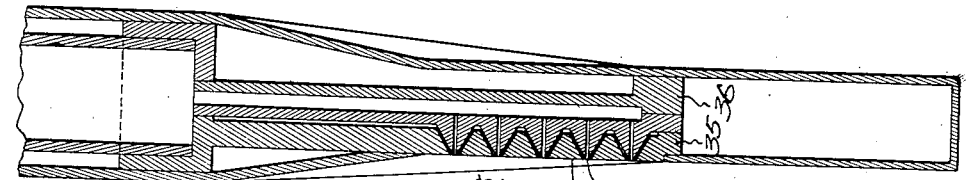
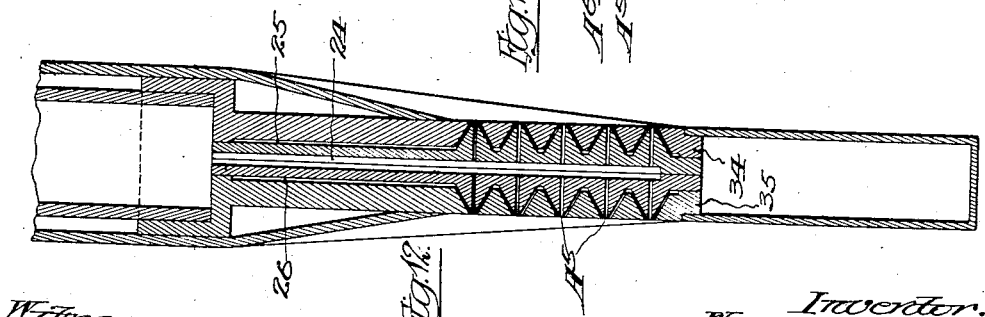

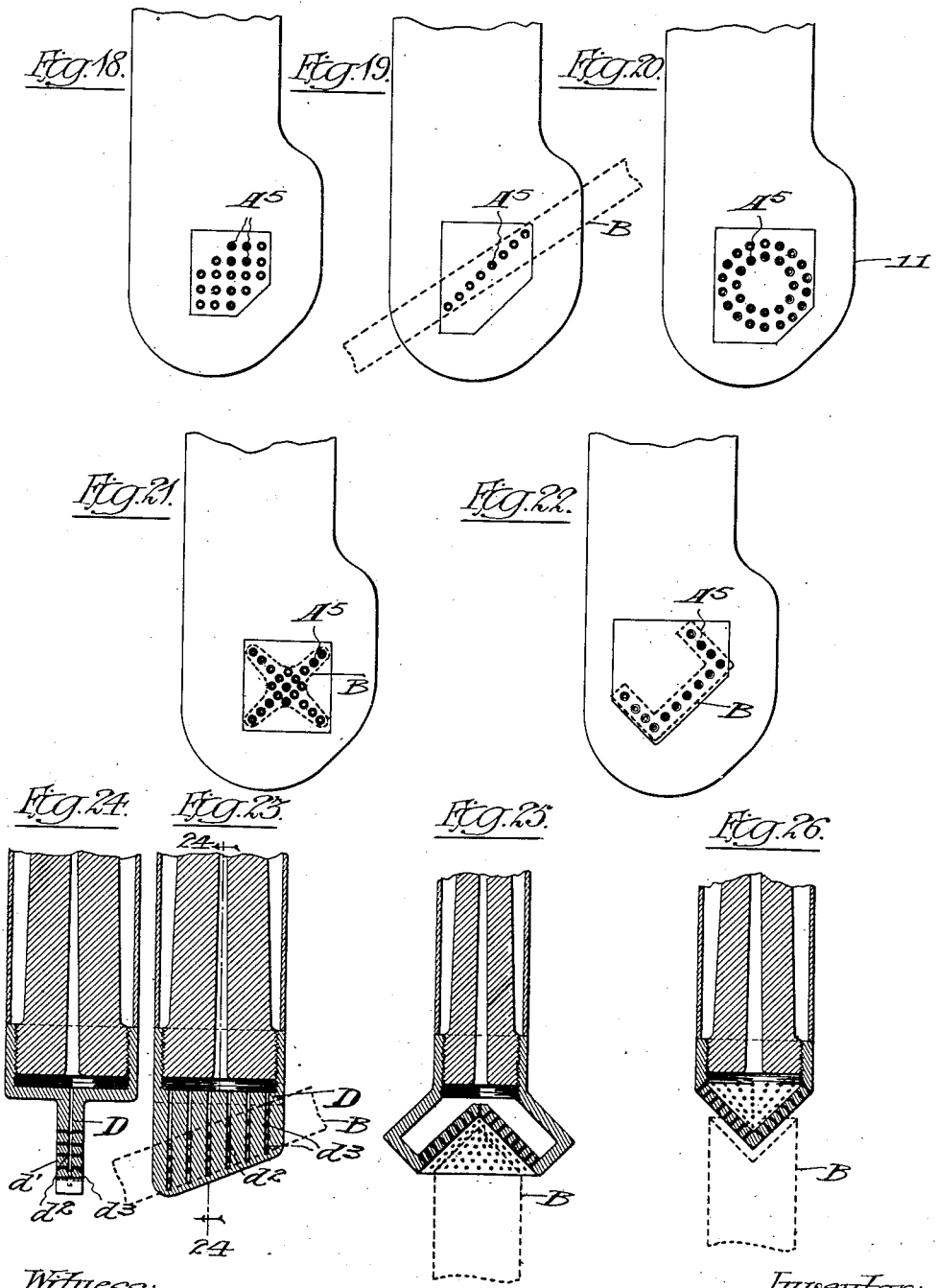

UNITED STATES PATENT OFFICE.

WALTER E. AMBERG, OF CHICAGO, ILLINOIS, ASSIGNOR TO AMBERG STEEL COMPANY, OF CHICAGO, ILLINOIS, A CORPORATION OF ILLINOIS.

WELDING-TORCH.

1,373,043.	Specification of Letters Patent.	Patented Mar. 29, 1921.

Application filed June 6, 1918. Serial No. 238,478.

*To all whom it may concern:*

Be it known that I, WALTER E. AMBERG, a citizen of the United States, and a resident of Chicago, county of Cook, and State of Illinois, have invented certain new and useful Improvements in Welding-Torches, of which the following is a specification.

My invention relates to improvements in gas torches such as are used in the art of welding together parts and pieces of metal, which art includes the welding of the opposed ends of single pieces, as in closing metal links and in welding the abutting and the lapping edges of an open seamed metal tube.

The present invention is a gas-burning torch which I have invented for use in fusing metals preparatory to welding pieces thereof together, and more particularly, for use in carrying out the novel welding process described and claimed in my companion application entitled "Metal welding," S. N. 237,014, filed May 28th, 1918.

In carrying out said process, I provide the pieces of metal that are to be welded with complementary surfaces; that is, with either plane or irregular surfaces which if placed together would meet and define the extent and form of the weld to be made. Having thus prepared the metal pieces, I then separately fuse the complementary surfaces by applying thereto high temperature gas flames and continuing the application to each surface until it is fused to a substantially uniform depth. In other words, I reduce each of the complementary surfaces to a fused, pasty or sticky condition. Having done so I place or press the fused surfaces together, thereby causing an intermingling of the metal and then hold the pieces in that condition until the fused metal sets and thus completes the weld.

The novel process referred to has other phases, but usually conforms to the foregoing description; and I find it desirable to quickly fuse the whole of each complementary surface (usually both surfaces) at the same instant, whereby substantial uniformity as well as speed is secured in the fusing operation. In the continuous conduct of the process, as in welding the longitudinal seam of a metal tube, the welding flames, at each given instant, effect only opposite and limited portions of the whole complementary edges or surfaces, the fusing operation being progressive in character. With this qualification the statement applies both to the intermittent and to the continuous conduct of the process.

The present invention ideally answers the requirements of my said process and is also capable of other uses, as will be made clear hereinafter.

My invention will readily be understood on reference to the accompanying drawings in which I have depicted the same in the best forms that I have thus far devised, and in which:—Figure 1 is a longitudinal section of a welding torch embodying my invention, the section being on the line 1—1, of Fig. 2;—Fig. 2 is a section on the line 2—2, of Fig. 1;—Fig. 3 is a section on the line 3—3, of Fig. 1;—Fig. 4 is a section of a torch tip identical with Fig. 2, but on an enlarged scale;—Fig. 5 illustrates the torch in action and discloses the form of the head or block which contains the gas jet openings or nozzles, the side of the water jacket being broken away to disclose the block;—Fig. 6 is an enlarged longitudinal section on the line 6—6 of Fig. 2;—Fig. 7 is a transverse longitudinal section on the line 7—7 of Fig. 6;—Fig. 8 is a transverse section on the line 8—8 of Fig. 6;—Fig. 9 illustrates the use of my invention in the welding of butt-seamed tubing and incidentally illustrates a modified form of my torch;—Fig. 10 is a sectional view of the torch on the line 10—10 of Fig. 9;—Fig. 11 illustrates a further simplified form of my novel torch;—Figs. 12, 13, 14 and 15 are longitudinal transverse sections of torch tips, like unto the tip shown in Figs. 1 to 8, but differing therefrom in several details;—Fig. 16 is a longitudinal section of the tip showing a gas mixing device which may be used therewith;—Fig. 17 is a section on the line 17—17 of Fig. 16;—Fig. 18 is a side view of the water-cooled tip shown in Figs. 1 to 8;—Figs. 19, 20, 21 and 22 are side views illustrating different groupings of the flame nozzles or jets;—Fig. 23 illustrates a modified form of the torch tip;—Fig. 24 is a sectional view on the line 24—24 of Fig. 23;—and Figs. 25 and 26 are sectional views illustrating special complementary torch tips for use in making conical butt welds and the like.

Figs. 1, 2, 3, 5, 9, 10, 11, 16, 17 and 18 to 26 show my novel torches in the full size in which they are usually made. The other figures of the drawings are enlargements, or may be taken to be views of tips of the larger sizes which are required in some classes of heavy work. The invention is not restricted to these dimensions; and there are many uses which require that the torch tips shall be even thinner than shown in the smallest of the drawings.

Considering the high temperatures at which the employed gases burn, it is desirable that in every case the tip proper shall be artificially cooled as by a flowing stream of water; but at the outset, I desire that it be understood that my invention is not limited to such water-jacketing of the torch tip for there are cases that admit of the employment of a bare tip. This fact is indicated in Figs. 23 and 24, wherein the tip proper is shown to be only remotely cooled.

The stock or shank of my novel torch, as adapted for most uses, resembles the shank of the oxyacetylene torch which is now in general use, and indeed may be identical therewith except in the matter of its juncture with the torch tip. As shown in Figs. 1 and 2 the shank comprises a barrel, 2, closed by a head, 3, and containing the gas pipes through which the gases are conducted to the tip. The barrel, 2, is joined to the head by a packed slip-joint, 4, to allow for longitudinal expansion and contraction. The head is equipped with the valved gas connections, 5, one for each gas pipe. As indicated at points, 6, the pipes within the barrel preferably also serve as gas check and filter cases. The torch shown in Figs. 1 and 2 is one that is adapted for use with two or more different gases that are not mixed until they emerge from the tip; and furthermore, the tip is one which is adapted to emit different mixtures or different gases from its two sides, hence the four gas pipes in the barrel, 2. One pair, 7, 8, serves one side of the torch tip and the other pair, 9, 10, serves the other side thereof.

The lower end of the barrel, 2, is closed by a thin and generally rectangular casing, 11, which is the water jacket of the tip about to be described. A water pipe, 12, is connected to the lower end of the water jacket, 11, and a second water pipe, 13, with the upper part of the barrel, 2. The cooling water may flow through the device in either direction, but generally will enter through the pipe, 13, flow downward, and out through the pipe, 12; a more uniform temperature being thus maintained in the space immediately surrounding the torch tip.

The torch tip in this case is a block, A, of metal which contains four gas passages, 14, 15, 16 and 17. The passages, 16 and 17, are supplied from the pipes 7 and 9; and the passages, 14 and 15, from the pipes 8 and 10. As shown, the block, A, is formed with an enlarged upper end, A', which contains respective sockets for the gas pipes. This end, A', also contains the cross ducts, 18, 18, which join the pipes, 7 and 9, to the ducts, 16 and 17, as best shown in Figs. 2 and 4. The end, A', also contains cross ducts, 19, 19, which join the pipes, 8 and 10, to the passages 14 and 15, as shown in Fig. 7.

The tip or block, A, is characterized by two, in this case, flat sides, $A^2$ and $A^3$; each of these sides is characterized by a large number of jet holes or nozzle openings grouped therein in manner to serve the purposes of the work to be done, as hereinafter explained. The nozzle openings, $A^5$, in the side, $A^2$, are served with gas from the passages 14 and 16; and the nozzle openings, $A^5$, in the side, $A^3$, are served through the passages 15 and 17.

It will be noted that the sides, $A^2$ and $A^3$, of the tip are flush with the sides, 11', of the water jacket, the sides 11' being provided with holes, 11", through which the tip sides project, as well shown in Figs. 4, 7 and 8. Most conveniently the holes in the sides of the jacket are substantially rectangular or polygonal, but may be made circular; whichever best fits the projecting sides of the tip or block, A, and is easiest to make.

As before stated, the water jacket, 11, is mainly rectangular in cross-section. This is clearly shown in Fig. 8. The junction portion, $11^a$, is of an expanded and irregular form as required to join the flat or thin water jacket proper to the cylindrical barrel, 2. The interlocking of the tip, A, with the sides of the water jacket obviously fixes the two parts against relative movement. The expansion and contraction of the pipes within the barrel, 2, is accommodated by the slip-joint, 4, before mentioned, and disruption of the joints between the tip, A, and the water jacket, 11, is thereby prevented. It will be understood that the joints between tip A and the sides of the water jacket are tightly closed as by welding or brazing them, to avoid leakage of water around the tip.

Reverting now to the groups of nozzle or jet openings which characterize the torch tip:—On reference to most of the figures of the drawings, it will be seen that I prefer to form these nozzles individually and of round or conical shape rather than as slots or irregular shapes. One reason for this is the greater ease with which such openings can be made; and the conical form has its explanation in the fact that the flames from the tip have the best effect when they are short; hence my use of a form of nozzle which causes the parts of the jet first to converge and then tend to diverge on leaving the side of the tip whereby the length of the flame is minimized. Thus, as shown in Fig. 4, the gas from the passages 14 and 15 escapes through the minute conical passages, 20, between the internal cones, 21, and the external cones, 22; while the gas from the passages, 16 and 17, finds escape through the small passages or ducts, 23, within the conical parts, 22. Preferably these passages, 23, taper toward the outside, the large end of each being in communication with the main supply passages, 16, 17. The arrangement is such that the outer ends of the ducts, 23, open slightly inward of the side or surfaces of the block, but any close approximation of that relation will serve the purpose of insuring an initial mixing of the gases from the passages 20 and 23, whereby the flames of the ignited gas are propagated close to the tip sides, $A^2$, $A^3$, the desirable short flames being thereby further insured. But main dependence in this regard is placed upon the relatively minute size of the nozzle openings and the regulation, by means of valves, 5, of the gas pressure in the supply passages 14, 15, 16 and 17.

As shown, the minute orifices, $A^5$, (20 and 23) are placed close together in a group or patch in each side of the tip and when the gas flowing therefrom is ignited the several flames of each group constitute what I have named a mat of flames or "mat-flame" which is substantially homogeneous or uniform throughout the area or space defined by the group or patch of holes in the side of the tip. This mat-flame may be of little height or depth as compared with its lateral extent and hence the torch may be placed very close to the surface of metal to be fused thereby and because of the intensity of the mat-flame almost instantaneous fusion follows the application of the flame to the metal.

The arrangement of the nozzle openings, $A^5$, in the side of the tip or block A may be varied according to the work to be done, which is also true of the size of the group as a whole. These matters will be made clear upon reference to the Figs. 18 to 26 of the drawings which show some, but by no means all, of the possible arrangements or groupings of the nozzle openings, $A^5$.

Generally speaking, work which is conducted continuously, such as welding of two strips of metal together, or the welding of the edges of a metal tube, requires that the middle portion of the group of nozzle openings, $A^5$, shall contain the greater number of said openings, in order that more heat may be delivered to the solid middle portion of the metal to be fused, and for the protection of the edges thereof from such high temperatures as would fuse them in advance of the middle portions. An example of such grouping of the nozzle openings is shown in Figs. 1, 5, 6, 16 and 18. A similar precaution should be observed in the making of butt-welds of large extent.

I have not herein attempted to illustrate all of the many practical uses of my invention, nor the extent to which my torches may be modified and adapted to many kinds of welding work. My companion applications, Serial Nos. 237,014 and 238,040 may be referred to for an explanation of the peculiar processes to which this torch is adapted and is relied upon to show how various kinds of butt-welds and various kinds of seam welds may be made by its use.

The dotted lines, B, appearing in the drawings of this application sufficiently illustrate the usual working relation between the torch tip and the metal surfaces to be fused by the flames therefrom, it being understood that the application of the flame mats endures for only an instant in each case, a momentary exposure being sufficient to raise the skin of the metal to the welding condition, following which the two complementary surfaces that have been fused are pressed together and so held until the fused metal sets and thus completes the weld. Continuous welding by which is meant, welding which is brought about by relative movement between the hot flames and the opposed surfaces, is sufficiently represented by Figs. 5, 9 and 11. The thick piece of work, B, shown in Fig. 5, requires a flame mat or group such as indicated in Fig. 5. The welding of thin metal edges, as in Figs. 9 or 11, may be accomplished with a single row of flames projected perpendicularly against the opposite edges or surfaces, B', of the work.

My novel torches are adapted for use with all such combustible gases as hydrogen, acetylene and carbon monoxid, singly and in enforced admixture with oxygen or air. It is an easy matter to adapt the torch for use with any of these gases or mixtures and if desired with different gases upon the two sides of the torch. This last explains the employment of the separate passages 14, 15, 16, and 17, in Figs. 1 to 8; a torch of that description being adapted for an oxy-acetylene flame mat upon one side and a monoxid or hydrogen flame upon the other side or for any other desired assortment of gases; and each side, obviously, may be regulated separately from the other side of the tip. This ability to separately regulate the opposite flame mats is of special utility in the welding of small rods, wires and the like to heavier bodies, the former requiring less heat and the latter more heat. In contrast, attention is directed to Fig. 12 which differs from Fig. 4 in the unifying of the ducts 16 and 17 (see duct 24 of Fig. 12), the partition, $16^a$, of Fig. 4 being omitted. A torch of the form shown in Fig. 12 is adapted to supply a single gas or a single mixture through the duct, 24. If desired different gases may be supplied through the passages 25 and 26; otherwise the operation is as before described, the same being of the twosided or double-tip type. The torch shown in Fig. 13 may be identical with the torches shown in Figs. 4 and 12, except that it is a single-sided device adapted to emit a mat-flame from only the side, A⁶, of the tip. The torch illustrated in Fig. 14 is a single-gas or single-mixture torch, wherein the gas to be burned, whether a simple gas or a mixture, is admitted through the duct, 26, and escapes through the orifices or nozzle openings, A⁷. In this case the conical portions, 28, are accommodated by conical holes in the sides, 11ª, of the water jacket, the joints being suitably closed to prevent leakage. One advantage of this torch is that the cooling water flows through the group of nozzle portions, 28, and lower temperatures are thus maintained throughout the mat flame surfaces. The torch of Fig. 15 is identical with Fig. 14, except that it is a one-sided torch instead of a double torch. It should be understood that a single-side torch is employed in conjunction with another of the same kind, i. e., such torches are used in pairs.

Fig. 16 illustrates a gas-mixing union, 29, which is desirable for torches of the kind shown in Figs. 12 to 15 when called upon to utilize mixed mixtures.

My torches when intended for use with a mixture of oxygen and acetylene may be of very simple forms as indicated in Figs. 9, 10 and 11; wherein the tip is a simple cored-out casting, C, characterized by a length suitable to the work, by a gas passage, C', by the gas ports or nozzle openings, C², and by the cooling water channels C³. In such cases the ports, C², whether in single or plural rows, may be bored directly in the sides of the casting, C. This is also true of the simpler torch tips shown in Figs. 24, 25 and 26. The tip D of Figs. 23 and 24 comprises a thin or blade-like portion, d', containing a plurality of ducts, d², wherewith the lateral nozzle openings, d³, communicate. Such a tip, whether single or double, may often be used for the welding of thin-walled tubing in accordance with my process.

Whenever the relation between the work and the torch tip is such as to closely confine the heat generated, the water cooling of the tip is a practical necessity, but under other circumstances it is possible to use unprotected tips as indicated, but not fully exemplified in Figs. 23 to 26.

It is characteristic of my double-sided torches that they are placed between the metal edges or surfaces to be united, and the tips are made thin in order that the span or space between those surfaces need not be too great. Thus in welding tubing it is sufficient if the crack or slot between the butt-edges is no greater than three-eighths of an inch; which makes it an easy matter to place the weld surfaces and the flame mats in substantial parallelism; i. e., in the relation of flame-attack in the preferred perpendicularity to the weld surfaces.

I believe that the greater number of users will prefer those forms of my invention that admit of the separation of the gases until the instant of ignition; for such torch tips are not only flexible in the choice of gases but are free from the annoyance of flame interruption by internal explosions of the gases; and many combustible gases cannot be admixed within the tip without the occurrence of such explosive combinations. Hence my preference is for torches of the several kinds exemplified in Figs. 1 to 8 and Figs. 18 to 22.

Because of the small dimensions of the several gas passages which characterize such forms of my invention the mechanical attainment thereof has been a matter of considerable difficulty. These difficulties, some pertaining to cost and others to actual difficulty of formation, are all overcome by constructing the tip in several sections as herein shown. These sections when placed together provide the necessary gas passages and obviously the convenience of the arrangement lies in the fact that each section may be made separate from the others. The process of die-casting the parts or sections is employed with a view to securing uniformity and interchangeability, and to lessen the cost thereof. After the sections are separately completed they are placed together and the joints between them are closed as by welding, brazing or soldering them.

Thus the torch tip shown in Figs. 1 to 8 is composed of five sections, to-wit, the middle section or partition, 30, two sections, 31, 31, and two sections, 32, 32. Each side of the torch shown in Fig. 12 comprises two sections, 34, and 35. In Fig. 13 one pair of these sections is replaced by a single member, 36. The torch of Fig. 14 comprises only the right and left sections, 37, 37, the same being united with the side walls of the water jacket, as before explained. I prefer that in every case the joints between the complementary parts of the tip shall be exposed at the ends of the block. If a joint opens because of poor workmanship the gas may leak directly into the water jacket and is not permitted to enter a space or passage containing a different gas.

Having thus described my invention, I claim as new and desire to secure by Letters Patent:

1. The herein described improvement for use in metal welding, comprising a torch formed to emit two mat flames in divergent relation, for the simultaneous fusion of opposed metal surfaces.

2. The herein described welding torch characterized by a surface containing a group of gas orifices so related that the flames emitted therefrom constitute a mat flame which conforms to the shape of the weld to be made.

3. The herein described welding torch characterized by a vertically elongated water jacket and a torch tip opening through the sides of said jacket, whereby said torch is adapted for use between, and to fuse the opposed surfaces of, the pieces to be welded.

4. The herein described welding torch, comprising a flat-sided body presenting a plurality of conical projections and containing a gas passage having branches which open outward through respective conical projections, and said projections being so spaced as to cause the flames emitted therefrom to merge into a mat flame.

5. An oxyacetylene torch containing gas passages and a plurality of outlet orifices, said orifices being arranged in registering pairs for the admixture of the gases and said pairs being spaced in longitudinal and transverse rows, at distances which result in the merging of the flames therefrom into a mat-flame.

In testimony whereof, I have hereunto set my hand this 3d day of June, 1918.

WALTER E. AMBERG.